United States Patent [19]

Komarek

[11] 3,969,062

[45] July 13, 1976

[54] BRIQUETTING ROLL HAVING REMOVABLE MOLD SEGMENTS

[75] Inventor: Karl R. Komarek, Chicago, Ill.

[73] Assignee: K. R. Komarek, Inc., Elk Grove Village, Ill.

[22] Filed: July 22, 1975

[21] Appl. No.: 598,056

[52] U.S. Cl. .................... 425/471; 425/182; 425/195; 425/237; 425/363; 29/119; 29/123; 29/124

[51] Int. Cl.² .................... B29C 1/00

[58] Field of Search .................... 29/119, 123, 124; 425/471, 194, 182, 237, 363

[56] References Cited

UNITED STATES PATENTS

| | | | |
|---|---|---|---|
| 538,475 | 4/1895 | Albrecht | 425/107 |
| 661,617 | 11/1900 | McCanna | 29/124 X |
| 915,332 | 3/1909 | Barnes | 425/195 |
| 1,232,764 | 7/1917 | Brundage | 425/109 |
| 2,294,098 | 8/1942 | Stromer | 83/12 |
| 2,518,785 | 8/1950 | Houk | 29/123 X |
| 2,798,676 | 7/1957 | Heer | 29/124 X |
| 2,945,259 | 7/1960 | Decker et al. | 425/195 |
| 2,958,902 | 11/1960 | Decker et al. | 425/195 |
| 2,958,903 | 11/1960 | Decker et al. | 425/195 |
| 3,077,634 | 2/1963 | Komarek et al. | 425/237 |
| 3,829,267 | 8/1974 | Woodward | 425/237 |
| 3,830,612 | 8/1974 | Komarek | 425/194 |
| 3,873,259 | 3/1975 | Kennedy | 425/237 X |
| 3,907,485 | 9/1975 | Komarek | 425/470 |

*Primary Examiner*—Robert L. Spicer, Jr.
*Attorney, Agent, or Firm*—Finnegan, Henderson, Farabow & Garrett

[57] ABSTRACT

A briquetting press roll is disclosed which includes a plurality of removable mold segments and means for attaching the mold segments to a cylindrical central core. The mold segments have, on their side walls, connecting means for engaging annular retaining rings. The annular retaining rings span the interface of the mold segments and the central core. The annular retaining rings engage the mold segments and the central core thereby affixing the mold segments to the central core.

20 Claims, 7 Drawing Figures

BRIQUETTING ROLL HAVING REMOVABLE MOLD SEGMENTS

FIELD OF INVENTION

The present invention relates to briquetting rolls for briquetting presses. In particular, the present invention is directed to a briquetting press roll having a plurality of removable mold segments and means for attaching the mold segments to a cylindrical central core. The present invention also relates to mold segments for use in briquetting press rolls.

BACKGROUND OF THE INVENTION

Briquetting of particulate materials has been carried out for many years. Typically, a material such as charcoal was compacted by briquetting apparatus at relatively low pressures and temperatures. In recent years, briquetting techniques have been applied to compact other materials, such as particulate metals or iron ores. Briquetting of such materials requires the use of high temperatures and pressures.

The use of high pressure between briquetting rolls and the maintenance of high pressure at elevated temperatures, as well as the abrasive nature of many materials, results in serious wear problems. Because of the serious wear problems encountered, briquetting press rolls having replaceable mold segments have received substantial commercial acceptance. Through the use of briquetting press roll designs employing replaceable mold segments, the severe wear problems encountered do not necessitate replacing an entire briquetting roll assembly, merely because the working surface has become worn.

Briquetting roll designs incorporating replaceable mold segments desirably possess a number of features. The design should permit the ready removal and replacement of worn segments. In addition, to retain proper alignment of mold cavities in cooperating rolls during briquetting operations, the mold segments should be rigidly retained in the press roll core so that they are constrained from moving relative to the core during briquetting operations. Furthermore, these desirable characteristics should be achieved in a design which is capable of being inexpensively fabricated without reliance upon extremely close tolerances.

A number of briquetting roll structures incorporating replaceable mold segments are known in the art. For various reasons, none of these is completely saatisfactory for use in present day briquetting operations.

One type of briquetting roll structure having replaceable mold segments is disclosed in U.S. Pat. No. 3,077,634. This briquetting roll comprises a cylindrical body adapted to receive a plurality of mold segments around the periphery of the cylindrical body, and at least two retaining rings which cooperate with the cylindrical body for maintaining the segments fixed to the cylindrical body. The mold segments of this design include two side walls which diverge with respect to each other relative to the bottom of the segment, and the retaining rings include inwardly beveled flanges adjacent their outer extremities which engage the converging end walls of the mold segments.

While this design has received some commercial acceptance, it is subject to several disadvantages. For example, to obtain rigid clamping of the mold segments in the cylindrical core, each of the segments must be precisely machined so that they are the same length. If one mold segment is longer than the others, it prevents the retaining rings from being drawn tightly about the other mold segments, and thus the other mold segments are free to move during briquetting operations.

If the segments are not tightly clamped in place, they tend to shift or rock in service and thereby destroy the cores. Moreover, in cases where the material being briquetted contains oil or some other liquid that lubricates the juncture between the segment and the clamping ring, this rocking of the segment becomes so severe that segmented rolls of this design cannot be used. This problem is aggravated by the fact that roll segments are always heat treated after machining and slight differences in the heat treating cycle or in the chemistry of the material will cause differences in the length of the segments and consequently significant differences in the rigidity with which they are clamped to the shaft.

In addition, the clamping action disclosed in U.S. Pat. No. 3,077,634 results from the axial translation of the circumferential retaining ring. For this reason, there is of necessity, axial clearance between the retaining rings and the roll core with the resultant consequence that there is no fixed axial position for the segments. Under this condition, sealing the two ends of the segments is difficult, or impossible. If the ends are not sealed, there will be leakage of particulate material past the sides of the rolls and satisfactory briquettes can not be formed.

The present invention overcomes many of the disadvantages of the present commercial briquetting apparatus, while providing a simple, easily maintained mold segment, retaining ring, and central core configuration applicable to most briquetting operations.

The invention also simplifies the structure and, hence the fabrication of the mold segment, the retaining means, and the central core of the briquetting roll. In addition, a mold segment structure is provided which is capable of being replaced without the need for extensive dismantling of the entire apparatus. Furthermore, the present invention provides a briquetting press roll in which clamping of replaceable segments in the roll core is achieved by translation of the clamping means toward the center of the core. Variations in the length of the segments do not affect the rigidity with which they are held.

SUMMARY OF THE INVENTION

The briquetting rolls of the present invention comprise a central cylindrical core having two side walls and a plurality of mold segments around the periphery of the core. Two annular retaining rings, one on each side of the central core, span the interface between the mold segments and the central core. The briquetting roll assembly also includes means for drawing the two annular retaining rings towards each other.

The side walls of the central cylindrical core each includes core locking means for detachably connecting the retaining ring to the core. The core locking means may preferably comprise either a surface on the core angularly disposed from the axis of rotation of the core, a right angle groove or flange on the core side wall, or straight-sided or tapered holes in the core side wall.

The mold segments comprise a top working surface, a bottom surface opposite the top surface, two opposite end walls connecting the top working surface the the bottom surface, which end walls diverge with respect to each other relative to the bottom surface, and two opposite side walls connecting the top working surface and the bottom working surface. The segment side walls include connecting means for detachably connecting the segments to the retaining ring. The connecting means preferably comprises either a right angle flange, or straight-sided or tapered holes.

The annular retaining rings include segment engaging means for engaging the connecting means of the mold segment side walls. The retaining rings also include an inner locking means for engaging the core locking means. The segment engaging means of the retaining ring preferably comprises either a right angle flange, or a plurality of straight-sided or tapered pins. The inner locking means of the retaining ring preferably comprises an angularly disposed surface disposed to engage a cooperating surface on the core, a plurality of straight-sided or tapered pins, or a right angle flange disposed to engage a groove or flange on the core side wall.

The means for drawing the two annular retaining rings towards each other rigidly affixes the mold segments to the central core. Preferably, the means for drawing the retaining rings towards each other comprises a bolt extending through the retaining rings and the central core.

Preferably, the distance between the connecting means of the mold segment and the core locking means of the core is greater than the distance between the segment engaging means and the inner locking means of the retaining ring. This preferred embodiment forces the mold segments toward the central core when the annular retaining rings are drawn towards each other.

The present invention also comprises a mold segment for a briquetting roll having a top working surface and a bottom surface opposite the top surface. Two opposite end walls connect the top working surface and the bottom working surface. Each of the end walls diverge with respect to each other relative to the bottom surface. Two opposite side walls also connect the top working surface and the bottom working surface, each of which side walls has at least one hole therein. The holes in the side walls provide means for detachably connecting the mold segment to a briquetting roll core. Preferably, the holes in the side walls are tapered.

In addition, the present invention comprises a retaining means for attaching mold segments to a central core of a briquetting roll. The retaining means comprises an arcuate ring section having means for engaging a mold segment adjacent the outer extremity thereof, and a flange adjacent the inner extremity thereof. The flange is beveled inwardly and away from the inner extremity.

BRIEF DESCRIPTION OF THE DRAWINGS

In the drawings:

FIG. 2 is essentially a cross-section of the right-hand portion of FIG. 4, taken along line 3–2 of FIG. 4.

DESCRIPTION OF THE PREFERRED EMBODIMENTS

Figure 1:
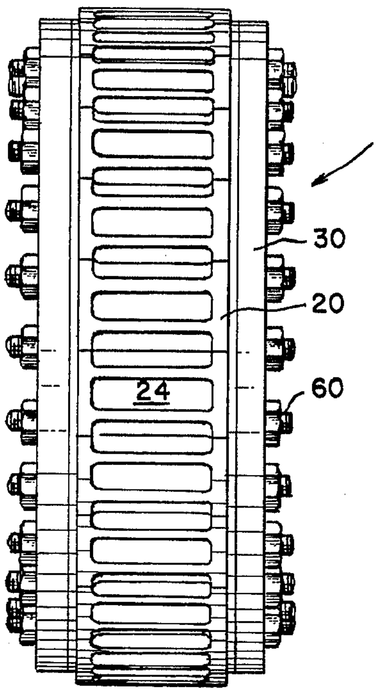
FIG. 1 is an end view of a briquetting roll system comprised of a central core, retaining rings, and mold segments.

FIG. 1 shows a briquetting roll 10 comprised of a plurality of mold segments 20 and two annular retaining rings 30. The central core 40, (not shown in FIG. 1), supports the mold segments 20 and the retaining rings 30, and rotates about an axis of rotation.

Figure 4:
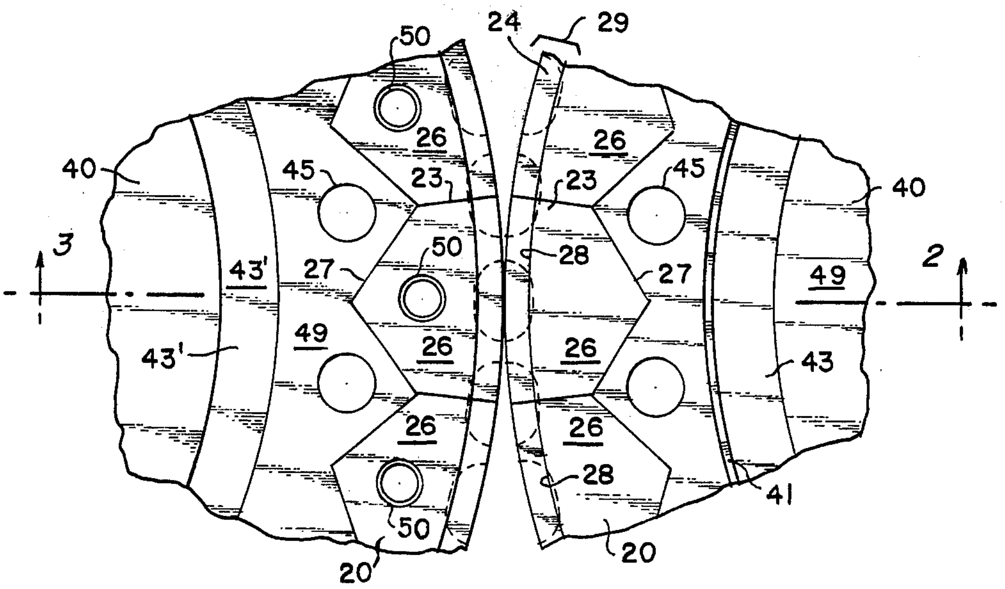
FIG. 4 is a fragmented side view of two cooperating briquetting rolls shown without the annular retaining rings, illustrating two different embodiments of the present invention.
Figure 5:
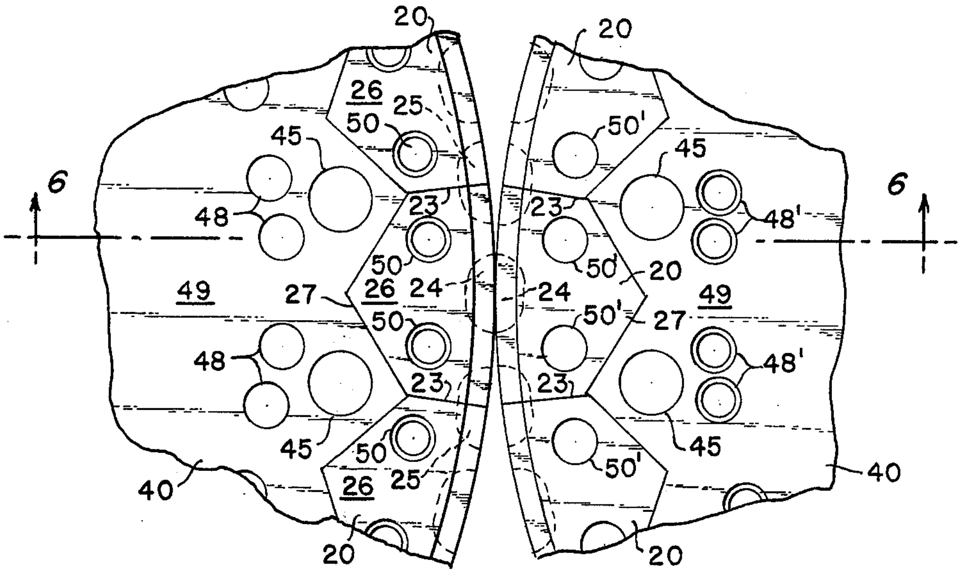
FIG. 5 is similar to FIG. 4, illustrating two additional embodiments of the present invention.

A briquetting roll 10 is used in connection with another briquetting roll as shown in the fragmented views of FIGS. 4 and 5. The two cooperating rolls compact particulate material between them, in the shape of the mold cavities 24, when the rolls are rotated about their respective axes of rotation in opposite directions.

The briquetting press rolls of the present invention comprise a central cylindrical core having two side walls. As embodied in the drawings (FIGS. 2–7), a central core 40 has two side walls 49. Preferably, as shown in FIGS. 4, 5, and 7, there are a plurality of V-shaped indentations in the circumferential surface of central core 40.

The side walls of the central cylindrical core each include core locking means for detachably connecting the retaining rings to the core. A particularly preferred embodiment of the core locking means is shown in FIGS. 2 and 7, and the right-hand portion of FIG. 4.

Figure 2:
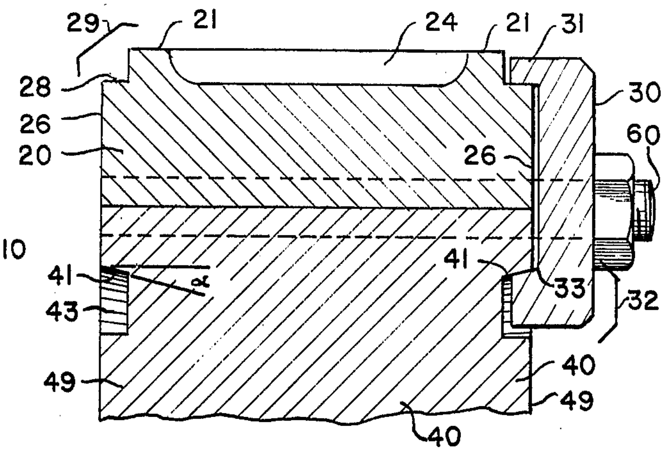
FIG. 2 is a cross-section of one embodiment of the present invention, illustrating the configuration of a mold segment, a single retaining ring, and a central core. Only one retaining ring is illustrated for purposes of clarity.
Figure 7:
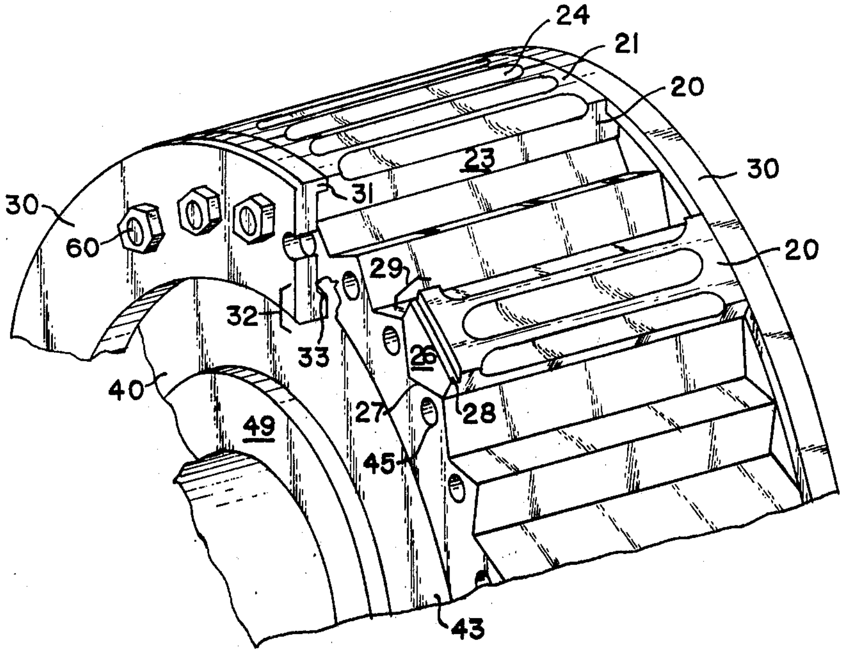
FIG. 7 is a fragmented perspective view of an entire briquetting roll employing one embodiment of the present invention.

As embodied in FIGS. 2 and 7, and the right-hand portion of FIG. 4, the core locking means comprises an annular flange or groove 43 on the side wall 49 of central core 40. The surface 41 is angularly disposed from the angle of rotation of the central core. Preferably, the core locking means surface 41 is angularly disposed from 10° to 30° from the axis of rotation of central core 40, measured as angle $\alpha$ in FIG. 2.

In accordance with other embodiments of the present invention the core locking means of the side walls of the cylindrical core may comprise a right-angled groove or flange on the core side wall, or straight-sided or tapered holes in the core side wall. As embodied in FIG. 3 and the left-hand portion of FIG. 4, the core locking means comprises a straight-sided groove 43' in the core side wall 49. As embodied in the left-hand portion of FIGS. 5 and 6, the core locking means comprises straight-sided holes 48 in the side walls 49 of central core 40.

Figure 6:
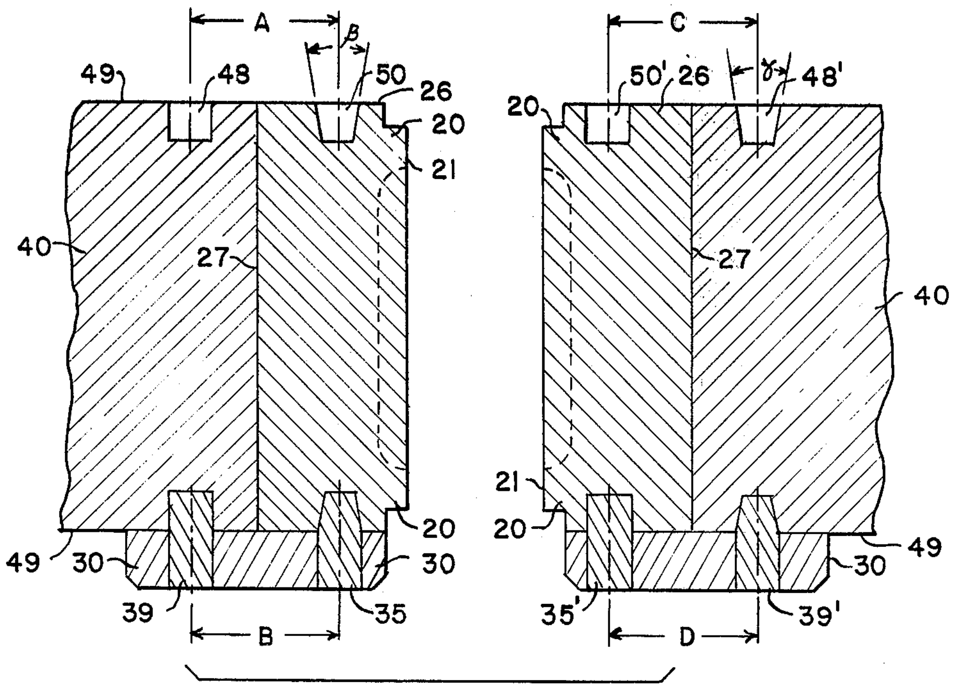
FIG. 6 is essentially a cross-section of the embodiments in FIG. 5, taken along the line 6—6, illustrating the configuration of a central core, mold segment, and retaining ring. As with FIGS. 2, and 3, only a single retaining ring is illustrated with each assembly for purposes of clarity.

In accordance with the embodiment of the invention depicted in the right-hand portions of FIGS. 5 and 6, the core locking means comprises tapered holes 48' in side walls 49 of central core 40. Preferably, the holes 48' are tapered at an angle, shown as $\gamma$ in FIG. 6 of from 2° to 10°.

The briquetting rolls include a plurality of mold segments around the periphery of the central core. As here embodied, the mold segments 20 comprise a top working surface 21. Preferably, the top working surface 21 is in the shape of a portion of a cylinder, and consists of a hard, highly heat and wear resistant material that can withstand the severe abrasion and pressure conditions which are normally present during briquetting operations. The top working surface of the mold segments 20 has at least one mold cavity 24 therein. The shape of the mold cavity 24 defines the shape of the briquetted particulate material formed by the operation of the apparatus.

The mold segments include a bottom surface opposite the top working surface. Normally the bottom surface of the segment mates with a surface on the central core. In the preferred embodiment, as best shown in FIGS. 4, 5, and 7, the bottom surface 27 of the mold segments is V-shaped and convex. The bottom surface 27 is engaged into the V-shaped indentations in the circumferential surface of central core 40. This preferred embodiment provides support for mold segments 20 and, in addition, prevents motion of the mold segments around the circumference of central core 40. While a V-shaped bottom surface is preferred, many other configurations are also suitable. For example, the bottom surface could be flat, or generally parallel to the top working surface.

The mold segments further include two opposite end walls connecting the top working surface and the bottom surface. In the embodiment depicted by the drawings, end walls 23 diverge with respect to each other relative to the bottom surface 27. The diverging end walls 23 permit a close abutting relationship between adjacent mold segments 20 around the periphery of central core 40.

Two opposite side walls of the mold segments also connect the top working surface and the bottom working surface. The segment side walls include means for detachably connecting the segments to the retaining ring.

As embodied in FIG. 2, the right-hand portion of FIG. 4 and FIG. 7, the connecting means for detachably connecting the segments to the retaining rings comprises a right-angled flange 29 on side walls 26. In accordance with a preferred embodiment, illustrated in FIGS. 3, 5, 6, and the left-hand portion of FIG. 4, the connecting means for detachably connecting the segments to the retaining ring comprises at least one hole in the side walls. In the most preferred embodiment, illustrated by FIG. 3 and the left-hand portion of FIG. 4, side walls 26 of mold segments 20 contain a single tapered hole 50 therein. In the embodiments shown in FIGS. 5 and 6, side walls 26 of mold segments 20 contain two straight sided holes 50' or tapered holes 50 therein. Preferably, the holes 50 are tapered to form an angle shown as $\beta$ in FIG. 6 of from 2° to 10°.

The briquetting rolls of the present invention include two angular retaining rings, one on each side of the central core, spanning the interface between the mold segments and the central core. The angular retaining rings include segment engaging means for engaging the connecting means of the mold segment side walls. Preferably, the means for engaging the mold segment is adjacent the outer extremity of the ring.

As shown in the embodiment of FIGS. 2 and 7, the engaging means of annular ring 30 may comprise a right-angle flange 31. In this embodiment, flange 31 of retaining ring 30 engages right-angle flange 29 on the side wall 26 of mold segment 20.

Figure 3:
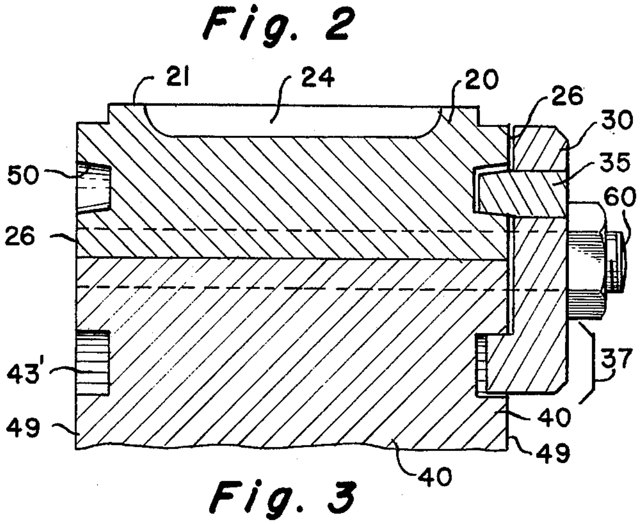
FIG. 3 is similar to FIG. 2, illustrating another embodiment of the present invention. This figure is essentially a cross-section of the left-hand portion of FIG. 4, taken along line 3–2.

As shown in the preferred embodiments of FIGS. 3 and 6, the segment engaging means of the annular retaining rings may comprise a plurality of pins. As embodied in FIG. 3, and the left-hand portion of FIG. 6, retaining ring 30 includes a plurality of tapered pins 35 which engage tapered holes 50 in the side walls 26 of the segments 20. In the embodiment shown in the right-hand portion of FIG. 6, straight-sided pins 35' engage straight-sided holes 50' in the side walls of the mold segments.

Pins 35 or 35' of the retaining ring 30 may be independently adjustable. By making the pins individually adjustable, engagement of the connecting means of the mold segment side walls by the engaging means of the retaining rings is largely independent of the length of adjacent mold segments. Accordingly, differences in the length of adjacent segments has no effect upon mating between the segment engaging means and the mold segment side wall connecting means. Thus, mold segments of different length can be simultaneously rigidly affixed to the segment engaging means of the retaining rings.

The annular retaining rings also include an inner locking means for engaging the core locking means of the central cylindrical core. As embodied in FIG. 3., the inner locking means on retaining ring 30 comprises a straight-sided flange 37. Flange 37 engages groove 43' in the side wall 49 of central core 40.

In the embodiments shown in FIG. 6, the inner locking means for engaging the core locking means comprises either straight-sided pins 39 or tapered pins 39' which engage holes 48 or 48' respectively, in the side walls 49 of central core 40. Pins 39, and 39', like pins 35, and 35', may be individually adjustable.

The most preferred embodiment of the inner locking means for engaging the core locking means is shown in FIGS. 2 and 7. As herein embodied, the inner locking means comprises an angularly disposed surface 33 on annular retaining ring 30. In the preferred illustrated form, the inner locking means comprises a flange 32 adjacent the inner extremity of retaining ring 30, which flange 32 is beveled inwardly and away from the inner extremity of the ring.

The annular retaining rings of the present invention are preferably in the form of a plurality of arcuate ring segments. By using a plurality of arcuate ring segments, it is possible replace a worn mold segment without removing the entire ring or needlessly displacing unworn mold segments from the central core.

As is apparent, in the various illustrated preferred embodiments, the segment engaging means of the angular retaining ring is adapted to mate and cooperate with the connecting means of the mold segment side walls. Similarly, the inner locking means of the retaining rings is adapted for mating and cooperating with the core locking means of the central core. For example, angularly disposed surface 33 on annular retaining ring 30 is complementary to angle $\alpha$ of angularly disposed surface 41 in the side wall 49 of central core 40. Similarly, pins 35' and 39' are tapered to mate with angles $\beta$ and $\alpha$ of holes 50' and 48' in the side walls of the segments or the central core.

The values previously referred to for the angles $\alpha$, $\beta$, and $\gamma$ represent preferred embodiments adequate to provide sufficient radial force against the segment to hold it rigidly against the roll core. However, the angles do not require excessive force to engage the various mating parts.

The briquetting rolls of the present invention also include means for drawing the two annular retaining rings toward each other. As here embodied, the means for drawing two opposing retaining rings toward each other comprises a threaded bolt 60 passing through retaining ring 30 and central core 40. As best seen in FIGS. 4 and 5, holes 45 allow the passage of the threaded bolt 60 through core 40.

In accordance with the present invention, it is preferred that the mold segment connecting means and the annular retaining rings segment engaging means, or the central cylindrical core core locking means, and the retaining ring inner locking means include angularly disposed mating surfaces. For example, the angularly disposed surfaces may be that of the core locking means and the inner locking means, such as shown in the embodiment of FIGS. 2 and 7. Similarly, the angularly disposed surfaces may be a tapered pin segment engaging means or inner locking means and a tapered hole connecting means or core locking means, such as shown in FIGS. 3–6.

In accordance with these embodiments, as the two annular retaining rings 30 are drawn together, the connecting means of the segment 20 engage and cooperate with the segment engaging means of annular retaining ring 30. Simultaneously, the core locking means of central core 40 engages and cooperates with the inner locking means of annular ring 30. If at least one of the connecting means-segment engaging means or the core locking means-inner locking means mating surfaces is angularly disposed, radial forces are exerted against mold segment 20, rigidly clamping it in place against mold segment 40. Rigid clamping is obtained even if there are slight variations in segment length.

It is also preferred that the distance between the connecting means of the mold segment and core locking means on the central core be greater than the distance between the segment engaging means and the inner locking means of the retaining ring. For example, with reference to FIG. 6, it is preferred that the distance between the center lines of the holes 50 or 50' in mold segments 20 and holes 48 or 48' in central core 40 (distance A or C) be greater than the distance between pins 35 or 35' and 39 or 39' in retaining rings 30 (distance B or D). This preferred embodiment also serves to exert inward radial forces against the mold segment, rigidly clamping the segment against the central core.

The present invention is not limited to the specific embodiments illustrated and described. Departures may be made from the described embodiments without departing from the principle of the invention, and without sacrificing its chief advantages.

I claim:

1. A briquetting roll comprising the combination of:

a. a central cylindrical core having two side walls, each of said side walls having core locking means for detachably connecting a retaining ring to said core;

b. a plurality of mold segments around the periphery of said core, each of said mold segments comprising:

1. a top working surface;
2. a bottom surface opposite said top surface;
3. two opposite end walls connecting said top working surface and said bottom surface, said end walls diverging with respect to each other relative to said bottom surface; and
4. two opposite side walls connecting said top working surface and said bottom surface, each of said side walls having at least one hole therein;

c. two annular retaining rings, one on each side of said central core, each spanning the interface between said mold segments and said central core, with each of said retaining rings having a plurality of pins engaging the holes in said side walls of said mold segments and an inner locking means for engaging said core locking means; and d. means for drawing the two annular retaining rings toward each other thereby affixing said mold segments to said central core.

2. The briquetting roll of claim 1 where said holes in said mold segment side walls are parallel to a line tangent to said top working surface.

3. The briquetting roll of claim 1 where said holes in said segments and said pins in said retaining rings are tapered.

4. The briquetting roll of claim 3 wherein said pins and said holes are tapered to form an angle of from 2° to 10°.

5. The briquetting roll of claim 1 wherein said core locking means comprises a surface thereon angularly disposed from the axis of rotation of said core and said inner locking means comprises a cooperating angularly disposed surface on said retaining rings.

6. The briquetting roll of claim 5 where said core locking means surface is angularly disposed from 10° to 30° from the axis of rotation of said central core.

7. The briquetting roll of claim 1 where said core locking means comprises a straight-sided groove in said core side walls and said inner locking means comprises a cooperating straight-sided flange on said retaining rings.

8. The briquetting roll of claim 1 where the distance between said holes in said mold segment side wall and said core locking means is a greater distance than the distance between said pins in said retaining rings and said inner locking means whereby the drawing of said annular retaining rings toward each other forces said mold segment toward said central core.

9. A briquetting roll comprising the combination of:

a. a central cylindrical core having two side walls, each of said side walls having core locking means for detachably connecting a retaining ring to said core;

b. a plurality of mold segments around the periphery of each of said mold segments comprising:

1. a top working surface;
2. a bottom surface opposite said top surface;
3. two opposite end walls connecting said top working surface and said bottom working surface, said end walls diverging with respect to each other relative to said bottom surface; and
4. two opposite segment side walls connecting said top working surface and said bottom surface, said segment side walls having connecting means for detachably connecting said segments to a retaining ring;

c. two annular retaining rings, one on each side of said central core, each of said retaining rings including segment engaging means for engaging said connecting means of said segment side walls and an inner locking means for engaging said core locking means;

d. said core locking means comprises a surface thereon angularly disposed from the axis of rotation of said core and said inner locking means comprising a cooperating angularly disposed surface on retaining rings; and e. means for drawing the two annular retaining rings toward each other thereby affixing said mold segments to said central core.

10. The briquetting roll of claim 9 where said retaining rings are comprised of a plurality of arcuate ring segments to allow the replacement of small numbers of said mold segments.

11. The briquetting roll of claim 9 where the means of drawing said retaining rings toward each other comprises a threaded bolt passing through said retaining rings and said central core.

12. The briquetting roll of claim 9 where said core locking means surface and said inner locking means surface are angularly disposed from 10° to 30° from the axis of rotation of said central core.

13. The briquetting roll of claim 9 where said connecting means of said segment side walls and said segment engaging means of said retaining rings comprise straight-sided flanges.

14. The briquetting roll of claim 9 where said connecting means of said segment side walls comprises a plurality of tapered holes in said side walls and said segment engaging means of said retaining rings comprises a plurality of tapered pins on said retaining rings, said pins engaging said holes in said side walls.

15. The briquetting roll of claim 9 where said bottom surface of said segment is V-shaped and engages a cooperating V-shaped surface on said central core.

16. The briquetting roll of claim 9 where the distance between said connecting means of said segment side walls and said core locking means is a greater distance than the distance between said segment engaging means on said retaining rings and said inner locking means whereby the drawing of said annular retaining rings toward each other forces said mold segment toward said central core.

17. A briquetting roll comprising the combination of:

a. a central cylindrical core having two side walls, each of said side walls having core locking means for detachably connecting a retaining ring to said core, said core locking means comprising at least one hole in each side wall;

b. a plurality of mold segments around the periphery of said core, each of said mold segments comprising:

1. a top working surface;
2. a bottom surface opposite said top surface;
3. two opposite end walls connecting said top working surface and said bottom working surface, said end walls diverging with respect to each other relative to said bottom surface; and
4. two opposite side walls connecting said top working surface and said bottom surface, said segment side walls having connecting means for detachably connecting said segments to a retaining ring; and c. two annular retaining rings, one on each side of said central core, each spanning the interface between said mold segments and said central core, each of said retaining rings including segment engagement means for engaging said connecting means of said segment side walls and an inner locking means for engaging said core locking means, said inner locking means comprising pins engaging the holes in said side walls of said central core; and d. means for drawing the two annular retaining rings toward each other thereby affixing said mold segments to said central core.

18. The briquetting roll of claim 17 where said pins on said retaining rings and said holes in said core are tapered.

19. The briquetting roll of claim 18 where said pins on said retaining rings and said holes in said core are tapered at an angle of from 2° to 10°.

20. The briquetting roll of claim 17 where the distance between said connecting means in said mold segment side walls and said holes in said core is greater than the distance between said segment engaging means and said pins on said retaining rings whereby the drawing of said annular retaining rings toward each other forces mold segments toward said central core.

* * * * *